United States Patent
Hietmann et al.

(10) Patent No.: US 10,016,894 B2
(45) Date of Patent: Jul. 10, 2018

(54) METHOD AND APPARATUS FOR CONTROLLING A ROBOT

(71) Applicant: KUKA Roboter GmbH, Augsburg (DE)

(72) Inventors: Gerhard Hietmann, Herbertshofen (DE); Marc-Walter Ueberle, Friedberg (DE); Christian Hartmann, Konigsbrunn (DE); Richard Schwarz, Friedberg (DE); Richard Rudolf, Augsburg (DE)

(73) Assignee: KUKA Deutschland GmbH, Augsburg (DE)

( * ) Notice: Subject to any disclaimer, the term of this patent is extended or adjusted under 35 U.S.C. 154(b) by 417 days.

(21) Appl. No.: 14/802,418

(22) Filed: Jul. 17, 2015

(65) Prior Publication Data

US 2016/0016314 A1    Jan. 21, 2016

(30) Foreign Application Priority Data

Jul. 17, 2014    (DE) .................. 10 2014 010 638

(51) Int. Cl.
*B25J 9/16*    (2006.01)

(52) U.S. Cl.
CPC ........... *B25J 9/1674* (2013.01); *B25J 9/1676* (2013.01); *G05B 2219/36468* (2013.01); (Continued)

(58) Field of Classification Search
CPC ........................................ B25J 9/16–9/1697
See application file for complete search history.

(56) References Cited

U.S. PATENT DOCUMENTS

| 5,363,474 A | 11/1994 | Sarugaku et al. |
| 9,211,646 B2 | 12/2015 | Tsusaka et al. |

(Continued)

FOREIGN PATENT DOCUMENTS

| CH | 701886 A2 | 3/2011 |
| CN | 101546196 A | 9/2009 |

(Continued)

OTHER PUBLICATIONS

Korean Patent Office; Office Action in Korean Patent Application No. 2015-0101161 dated Aug. 10, 2017; 12 pages.

(Continued)

*Primary Examiner* — Adam R Mott
(74) *Attorney, Agent, or Firm* — Wood Herron & Evans LLP (57) ABSTRACT

A method for controlling a robot in at least one pose of the robot wherein the robot can be operated in either a first mode of operation or a second mode of operation. In the second mode of operation the robot can be moved by manually applying a guiding force to the robot. The method includes determining a distance of a state variable of the robot from a first limit and then triggering a safety response when the distance satisfies a first condition and the robot is operating in the first mode of operation. When the robot is operating in the second mode of operation and the distance satisfies the first condition, the method includes not triggering the safety response, and motorically applying a positioning force to the robot in dependence on the determined distance so that the distance can be reduced when the robot is unobstructed.

23 Claims, 2 Drawing Sheets

(52) U.S. Cl.
CPC .............. *G05B 2219/40371* (2013.01); *G05B 2219/49141* (2013.01); *Y10S 901/09* (2013.01)

(56) References Cited

U.S. PATENT DOCUMENTS

| | | | |
|---|---|---|---|
| 2004/0189631 A1* | 9/2004 | Kazi | B25J 9/1671 345/418 |
| 2006/0142657 A1* | 6/2006 | Quaid | A61B 17/1764 600/424 |
| 2009/0299618 A1 | 12/2009 | Cornelius et al. | |
| 2011/0224826 A1* | 9/2011 | Maehara | B25J 9/1676 700/255 |
| 2011/0295399 A1* | 12/2011 | Plociennik | B22D 7/00 700/97 |

FOREIGN PATENT DOCUMENTS

| | | |
|---|---|---|
| CN | 103914035 A | 7/2014 |
| DE | 102005054575 B3 | 4/2007 |
| DE | 10 2006 022 889 A1 | 11/2007 |
| DE | 10 2006 046 759 A1 | 4/2008 |
| DE | 698 38 934 T2 | 1/2009 |
| DE | 10 2008 005 926 A1 | 7/2009 |
| DE | 10 2008 021 671 A1 | 11/2009 |
| DE | 10 2008 024 950 A1 | 11/2009 |
| DE | 10 2008 062 623 A1 | 6/2010 |
| DE | 10 2013 000 250 A1 | 7/2014 |
| EP | 0927612 A1 | 7/1999 |
| EP | 2082852 A2 | 7/2009 |
| EP | 2113344 A1 | 11/2009 |
| EP | 2754537 A2 | 7/2014 |
| JP | 4759660 B2 | 8/2011 |
| JP | 2011206886 A | 10/2011 |
| KR | 20110106279 A | 9/2011 |
| WO | 2007131712 A1 | 11/2007 |
| WO | 2008040426 A1 | 4/2008 |
| WO | 2010066318 A1 | 6/2010 |

OTHER PUBLICATIONS

Chinese Patent Office; Office Action in Chinese Patent Application No. 2015104236037 dated Sep. 6, 2016; 17 pages.
European Patent Office; Search Report in European Patent Application No. 15002088.1 dated Dec. 17, 2015; 7 pages.
German Patent Office; Examination Report in German Patent Application No. 10 2014 010 638.1 dated Jun. 26, 2015; 8 pages.
German Patent Office; Search Report in German Patent Application No. 10 2014 010 638.1 dated Jun. 26, 2015; 10 pages.
Chinese Patent Office; Examination Report in Chinese Patent Application No. 2015104236037 dated Apr. 14, 2017; 10 pages.

* cited by examiner

METHOD AND APPARATUS FOR CONTROLLING A ROBOT

CROSS-REFERENCE TO RELATED APPLICATIONS

This application claims the benefit of priority under 35 U.S.C. § 119(a) to German Patent Application DE 10 2014 010 638.1, filed Jul. 17, 2014 (pending), the disclosure of which is hereby incorporated by reference in its entirety.

TECHNICAL FIELD

The present invention relates to a method for controlling a robot, as well as a device and a computer program product to execute such a method.

BACKGROUND

Controlling a robot by determining the distance of a state variable of the robot from a limit, and triggering a safety action when this distance satisfies a prespecified condition, is well-known from practical in-house experience. A STOP 0, for example, can be triggered, i.e. the robot can be shut down by interrupting the power supply, as soon as its Tool Center Point (TCP) exceeds a work space limit or its speed exceeds a permissible speed limit.

It is also well-known from practical in-house experience, that this can be tested by manually taking the robot to such limits; i.e. manually taking the TCP over the work space limit, or operating with a speed exceeding the speed limit, to test if this triggers the safety action.

Particularly for more complex limits, such as work space limits that are defined by curved hypersurfaces in the state space of the robot and/or as a function of the state variable itself, however, this type of test is difficult and is notably not very intuitive.

Besides determining a distance to a prespecified limit, identifying the distances of a current position to a group of saved positions and selecting that saved position, of which the distance to the current position is minimal in a program, is also well-known from our own DE 10 2008 062 623 A1.

SUMMARY

The object of the present invention is to improve the control of a robot. In doing so, in the interest of a more compact presentation, both control in the narrower cybernetic sense, i.e. a specification of control variables independent of acquired actual values ("feedforward control"), and regulation, i.e. a specification of control variables on the basis of prespecified target values and acquired actual values ("feedback control"), are generally referred to as control.

This object is solved by a method as discussed herein.

According to one aspect of the present invention, a robot is optionally controlled in one or more, preferably all, poses in a first mode of operation or a second mode of operation, different from the first, in particular by a device configured for this purpose.

In the present case, a pose is understood in particular to be the position of the robot, definable, in particular defined, by the coordinates, in particular angles, of its joints, or rather the position and/or orientation of its links relative to one another.

The mode of operation can be switched between the first and second in one model, in particular automatically via a mode of operation selection means of the device, and/or via a user input. Correspondingly, in one model, the robot can optionally be controlled in the first or the second mode of operation in at least one pose; in a further development it can even also be controlled in one or more modes of operation different from it. The selection of the mode of operation can be pose-dependent or pose-independent; the first or second mode of operation can in particular be selected in advance and then any pose can be set.

In both the first and the second mode of operation a distance of a state variable of the robot from a first limit is determined, in particular via a distance means of the device configured for this purpose, whereby the distance is preferably determined in the same way in the first and second mode of operation.

A one- or multidimensional state variable in the sense of the present invention can include, in particular be, one or more, preferably three, position coordinates, for example Cartesian, cylindrical or spherical coordinates, and/or one or more, preferably three, orientation coordinates, for example Euler or Cardan angles, of one or more robot-fixed references, in particular of a TCP of the robot, and/or a first and/or higher time derivative thereof. Position and orientation coordinates can also include, in particular be, Denavit-Hartenberg parameters, quaternions or the like. In addition or alternatively, a one- or multidimensional state variable in the sense of the present invention can include, in particular be, in particular one or more, preferably all, joint coordinates of the robot and/or at least a first and/or higher time derivative thereof.

A distance of a state variable from a limit can be defined or determined in particular via a standard, for example an, in particular weighted, amount or maximum standard. For example, the distance of a three-dimensional position (x, y, z) from a linear limit defined by y=z=0 can be similarly defined via the amount standard $\Box(y^2+z^2)$ or via the maximum norm max{y, z}.

In one model the limit is oriented and the distance is vectored or signed, so that a state variable exhibits a positive or negative distance when it lies on the one or other side of the oriented limit. In this way the distance of a three-dimensional position (x, y, z) from a planar limit defined by x=0 can be defined by the component x and is correspondingly positive or negative, when the position lies above or below the limit. In this manner, in one model, a permissible approach of the robot to the limit can simply and/or reliably be differentiated from an impermissible encroachment into a prohibited range defined by the limit.

In the first mode of operation, a safety response is triggered when the distance satisfies a first condition, in particular exceeds or falls below a specified first limit value.

The safety response can in particular include, in particular be, a shutdown of the robot, in particular by one or more, preferably mechanical, brakes and/or one or more, preferably all, drives of the robot, and/or a separation of one or more, preferably all, drives of the robot from the power supply, in particular prior to or after shutdown. Accordingly, the safety response can include a so-called STOP 0, i.e. a shutdown of the robot via mechanical brakes and separation of all the drives of the robot from a power supply prior to shut down; a so-called STOP 1, i.e. a shutdown of the robot via its drives and separation of the drives from a power supply after shut down; or a so-called STOP 2, i.e. a shutdown of the robot via its drives without separation of the drives from a power supply after shutdown, in particular be such a STOP. The safety response is preferably triggered and/or executed, in particular redundantly, preferably in a variety of ways, using secure technology.

In the second mode of operation the robot can be moved by manually applying a guiding force to the robot. For this purpose the robot can be, or can be made to be, gravity-compensated, in particular preferably in a per se known manner, so that it follows a manually applied guiding force and at least essentially maintains its new pose when this guiding force ceases. The robot can likewise be, or can be made to be, impedance-controlled, in particular preferably in a per se known manner, so that it follows a manually applied guiding force and at least essentially returns to its previous or a specified pose when this guiding force ceases. Preferably the robot can be moved by manual application of a guiding force on the robot, by means of a force control or a corresponding soft position control.

The robot can be movable by manual application of a guiding force on the robot in the first mode of operation as well, in particular in the same manner as in the second mode of operation. In a different model the robot is moved program-controlled automatedly in the first mode of operation; it can in particular run a specified path, or set a specified pose, in particular several times in succession.

In the second mode of operation, however, in contrast to the first mode of operation, the safety response is not triggered in the same pose or poses, because the distance satisfies the first condition, in particular not (already) triggered when, or rather as soon as, the distance satisfies the first condition. In other words, satisfying the condition, which is enough to trigger the safety response in the first mode of operation, is not enough to trigger the safety response in the second mode of operation. Instead, when the distance satisfies the first condition, a positioning force is motorically applied to the robot in dependence on the distance, so as to reduce the distance when the robot is unobstructed.

In accordance with this aspect, safety monitoring for the first mode of operation, which triggers the safety response in the first mode of operation when the distance satisfies the first condition, for example the TCP exceeds a specified work space limit or its speed exceeds a specified speed limit, can thus be tested in the second mode of operation by intentional manual exceedance of these limits, without triggering the safety response.

Instead, in this case, a positioning force is motorically applied to the robot in dependence on the distance that seeks to reduce the distance, or is such that it reduces the distance when the robot is unobstructed. In other words, virtual constraints embodied by the first limit push the robot, encroaching beyond the first limit into a prohibited range, back. The operator, who is manually guiding the robot across the limit, thus haptically experiences the resistance of this positioning force pushing back toward the limit.

Safety monitoring or specified first limits can thus be tested and/or experienced intuitively, in particular, in a manner of speaking, haptically sensed and/or detected with the robot.

In one model, the positioning force in the second mode of operation is only applied to the robot when the distance satisfies the first condition, so that it cannot be haptically experienced through the positioning force until the first limit is reached or exceeded. In another model, the positioning force in the second mode of operation is also applied to the robot when the distance satisfies the first condition. Under certain circumstances, however, it is also applied when the distance does not yet satisfy the first condition, so that it can already be haptically experienced through the positioning force prior to reaching, or rather when approaching, the first limit.

The positioning force can in particular be, or be made to be, directed to the first limit. In one model it is dependent on the distance and/or a first and/or higher time derivative thereof, in particular proportional to it, and/or limited to a maximum value.

In addition to the positioning force in one model, an, in particular optic, acoustic and/or haptic, signal, in particular a vibration, is emitted in the second mode of operation when the distance satisfies the first condition. This can provide additional and/or more sensitive or precise feedback with regard to reaching the first limit. In one model, a vibration can be emitted by a vibrotactile element, in particular for manual application of the guiding force, and/or an input device to input control instructions, or a corresponding changing or pulsating control of the drives of the robots.

In one model, a signal-technical and/or physical output of a distance means to determine the distance is connected in the first mode of operation with a safety means to trigger the safety response, and in the second mode of operation alternatively with a signal means to emit the signal. The same determination of the distance, executed in the first mode of operation to trigger the safety response, can thus be reliably, signal-technically and/or physically, tested in the second mode of operation.

In one model, a first safety response is triggered in the first mode of operation, when a first distance of a first state variable from a first limit satisfies a first condition, and in the second mode of operation in a further development the first safety response, and in another further development a second safety response different from the first safety response is triggered, when in a further development the first distance and in another further development a second distance different from the first distance in a further development of the first state variable and in another further development a second state variable of the robot different from the first state variable from a second limit different from the first limit in a further development satisfies the first condition and in another further development satisfies a second condition different from the first condition, in particular without the positioning force being motorically applied to the robot in dependence on the distance, to reduce the distance when the robot is unobstructed.

Additionally or alternatively in one model, a first safety response is triggered in the first mode of operation, when a first distance of a first state variable from a first limit satisfies a first condition, and in the second mode of operation in a further development the first safety response, and in another further development a second safety response different from the first safety response is triggered, when in a further development the first distance and in another further development a second distance different from the first distance in a further development of the first state variable and in another further development a second state variable of the robot different from the first state variable in a further development of the first limit and in another further development of a second limit different from the first limit satisfies a second condition different from the first condition in particular without the positioning force being motorically applied to the robot in dependence on the distance, to reduce the distance when the robot is unobstructed.

If, for example, the first state variable is a current Cartesian position (x, y, z) of the TCP; the first limit is a specified planar work space limit G: x=0; the first distance d is the sign-oriented difference between this position and this work space limit; the first condition is that this first distance is greater or equal to zero (d ☐0); and the first safety response is a STOP 1, then in a model in the second mode of operation in a further development a STOP 1 (the first safety response) and in another further development a STOP 0 or STOP 2 (a second safety response different from the first safety response) is triggered, when the sign-oriented component x (the first distance d) of the first state variable (x, y, z)

from a second limit different from the first limit, for example G': x=1, satisfies the first condition (d ☐0).

Therefore, in this example in the second mode of operation, instead of a STOP 1 when the limit x=0 is exceeded, a STOP 0, 1 or 2 can be executed when the TCP exceeds a different limit.

Similarly in the above example in the second mode of operation in a further development a STOP 1 (the first safety response) and in another further development a STOP 0 or STOP 2 (a second safety response different from the first safety response) can be triggered, when a sign-oriented difference (the first distance d) between a Cartesian speed $v_{actual}$ of the TCP (a second state variable of the robot different from the first state variable) and a permissible maximum speed $v_{actual}$ (a second limit different from the first limit) satisfies the first condition (d ☐0).

Therefore, in this example in the second mode of operation, instead of a STOP 1 when the limit x=0 is exceeded, a STOP 0, 1 or 2 can be executed when the TCP exceeds a permissible maximum speed.

Similarly in the above example in the second mode of operation in a further development a STOP 1 (the first safety response) and in another further development a STOP 0 or STOP 2 (a second safety response different from the first safety response) can be triggered, when the maximum d'=max{y, z} of a deviation of a component (a second distance different from the first distanced) of the current Cartesian position (x, y, z) of the TCP (of the first state variable) from a second limit (y=z=0) different from the first limit satisfies a second condition d'>$d_{max}$ different from the first condition.

Therefore, in this example in the second mode of operation, instead of a STOP 1 when the limit x=0 is exceeded, a STOP 0, 1 or 2 can be executed when the TCP exceeds a different limit.

Similarly in the above example in the second mode of operation in a further development a STOP 1 (the first safety response) and in another further development a STOP 0 or STOP 2 (a second safety response different from the first safety response) can be triggered, when the first distance d of the first state variable (x, y, z) from the first limit G: x=0 satisfies a second condition different from the first condition, for example $$\int_t d(\tau)d\tau > d_0.$$

Therefore, in this example in the second mode of operation, instead of a STOP 1 when the limit x=0 is exceeded, a STOP 0, 1 or 2 can be executed when an integral of the difference d between the position and the work space limit over the time t exceeds a specified limit $d_0$.

By triggering a safety response in the second mode of operation without motorically applying the positioning force on the robot in dependence on the distance, so as to reduce the distance when the robot is unobstructed, the safety monitoring, so to speak, overrules the haptic interaction in the second mode of operation if required. In other words, the positioning force in dependence on the distance, so as to reduce the distance when the robot is unobstructed, is only applied in the second mode of operation, if or as long as the first condition is satisfied AND a second condition different from it is not satisfied.

In one model, the first limit and/or a limit to which a distance is determined in the second mode of operation depend on a state variable, in particular the state variable, the distance of which to this limit is determined. The specification of advantageous position-, direction-, orientation- and/or speed-dependent limits in a model is therefore made possible.

In one model, the first limit and/or a limit to which a distance is determined in the second mode of operation is defined by two or more hypersurfaces, in particular one or more pairs of two parallel or non-parallel hypersurfaces, and/or by one or more curved hypersurfaces in a state space of the robot. A curved hypersurface advantageously allows a more precise and/or numerically more easily manageable consideration of more complex limits. A curved hypersurface is preferably simulated by so-called NURBS.

In one model, in the second mode of operation, the robot is moved, in particular intentionally, by manual application of a guiding force on the robot in such a way that the distance of the state variable of the robot from the first limit satisfies the first condition.

According to another aspect of the present invention, which can preferably be combined with the previously described aspect, a distance of a state variable of the robot from two or more, different from one another, specified references in a state space of the robot is determined in a mode of operation when the robot is moved by manual application of a guiding force on the robot, in particular by a device designed for this purpose, the smallest of these distances is determined, and a positioning force is motorically applied to the robot so as to minimize the smallest of the distances when the robot is unobstructed, or rather seeks to minimize the determined smallest distance or rather is such that it minimizes this determined smallest distance when the robot is unobstructed.

The mode of operation can in particular be the previously described first or second mode of operation or it can also be another different mode of operation.

Correspondingly, in one model, in particular via the mode of operation selection means of the device, this mode of operation can be switched to automatically and/or via a user input.

The state variable can in particular be one of the previously described state variables, in particular therefore one or more position and/or orientation coordinates of the TCP, joint coordinates, or the like. The distance can in particular be one of the previously described distances, in particular an amount or maximum standard, or the like. In one model the distance is not signed, and is in particular always positive. In particular, if distances can also exhibit negative values, in one model the smallest of these distances in terms of the amount is determined and a positioning force is motorically applied to the robot, so as to minimize this smallest distance in terms of the amount when the robot is unobstructed.

In one model, the state space of the robot is the space, or rather the quantity, of all possible values of the state variable, for example the Cartesian work space or the space of possible joint coordinates. In another model, the state space of the robot is a specified proper subset of the space, or rather the quantity of all possible values of the state variable. By specifying a radius around the current TCP position, for example, the user can specify a (hyper) sphere as a state space, so that the system searches only in this state space which has been limited by a specification or an input in the manner described here. Correspondingly, in one model, the state space is variably specifiable or specified, in particular by a user.

According this aspect the robot is taken to the next of several specified references. This can in particular simplify the locating, and thus the reading, of the previously described limits. Correspondingly, a reference in the sense of this aspect can in particular be a limit in accordance with the previously described aspect. In particular, it can similarly simplify the locating of saved poses, program points and the like. Likewise, it can in particular simplify the locating of not directly saved intermediate points on tracks specified by saved points, surfaces and the like. Correspondingly, a reference in the sense of this aspect can generally be in particular a specified, in particular saved, value or value range, in particular a line, (hyper) surface or a (hyper) volume, of the state variable or the state space. For example, a saved TCP position is a value in the work space of the robot, an (intermediate) point on a saved track of the TCP, a value range or a line in the work space and a limit in accordance with the previously described aspect, in particular a (hyper) surface in the work space.

Correspondingly, in one model, the specified references in the state space of the robot include positions of a robot-fixed reference, in particular a TCP, and/or poses of the robot, in particular a specified track of the robot, and/or, in particular virtual, structures, in particular walls and/or coordinate systems, in the state space of the robot.

In one model the reference in the state space of the robot, which exhibits the determined smallest distance, is displayed, in particular by highlighting a corresponding program instruction in a saved program of the robot. As in DE 10 2008 062 623 A1 mentioned at the outset, to which reference was made in the interest of completeness, and the content of which is expressly included in the present disclosure, the user can thus advantageously more easily test and/or change a saved program.

In one model the robot is controlled flexibly, in particular in a force-regulated and/or gravity-compensated manner, so as to be movable by manual application of a guiding force to the robot, preferably as already described above with reference to the previous aspect. The positioning force can in particular be applied by an impedance control, the desired or target value of which is that reference in the state space of the robot, for which the smallest value is, or has been, determined. In other words, via the impedance control, preferably in a per se known manner, a virtual spring is, or can be, tensioned between the current, or actual, pose of the robot and the reference, for which the smallest distance is, or has been, determined. The unobstructed robot is taken to this reference by the impedance control and thus minimizes the distance.

A means in the sense of the present invention can be hardware- and/or software-technically configured, in particular an, in particular digital, processing unit, in particular microprocessor unit (CPU), preferably data- or signal-linked with a memory and/or bus system, and/or exhibit one or more programs or program modules. The CPU can be configured to execute commands, which are implemented as a program stored in a memory system, acquire input signals from a data bus and/or deliver output signals to a data bus. A memory system can exhibit one or more, in particular different, storage media, in particular optical, magnetic, solid-state and/or other non-volatile media. The program can be structured in such a way that it embodies, or is able to execute, the processes described here, so that the CPU can execute the steps of such processes and thereby in particular control the actuator.

BRIEF DESCRIPTION OF THE FIGURES

Additional advantages and features result from the dependent claims and the design examples. For this purpose, the figures show, in part schematically:

DETAILED DESCRIPTION

Figure 1:
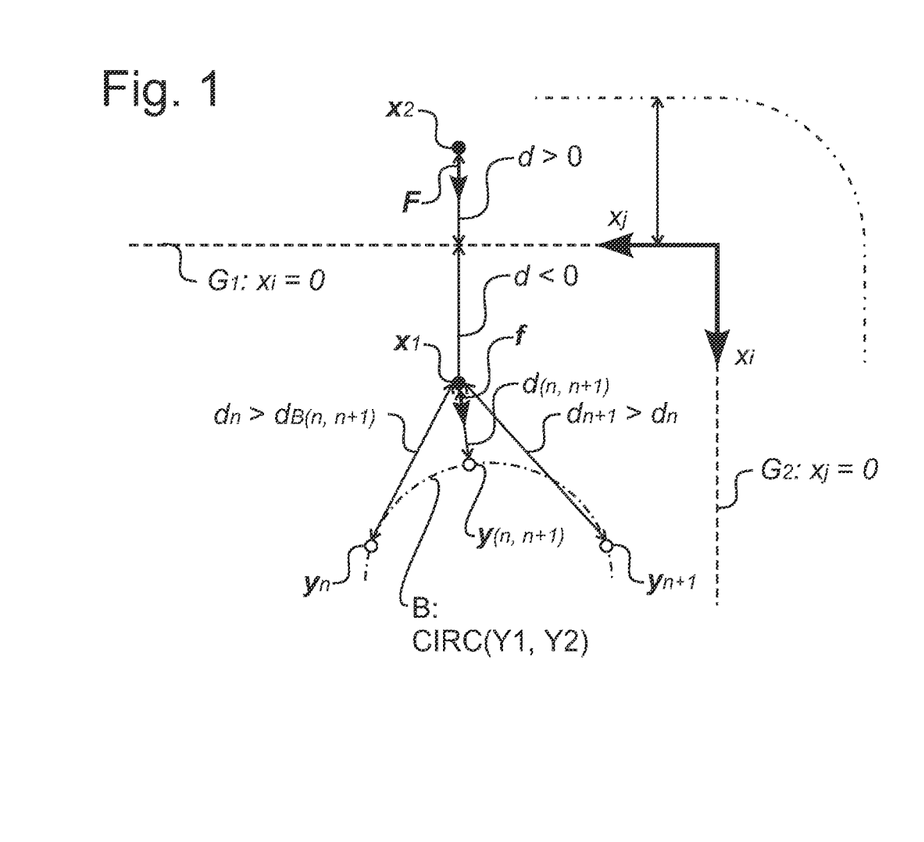
FIG. 1 is a schematic illustration of a section of a state space of a robot to illustrate a method according to one model of the present invention.
Figure 2:
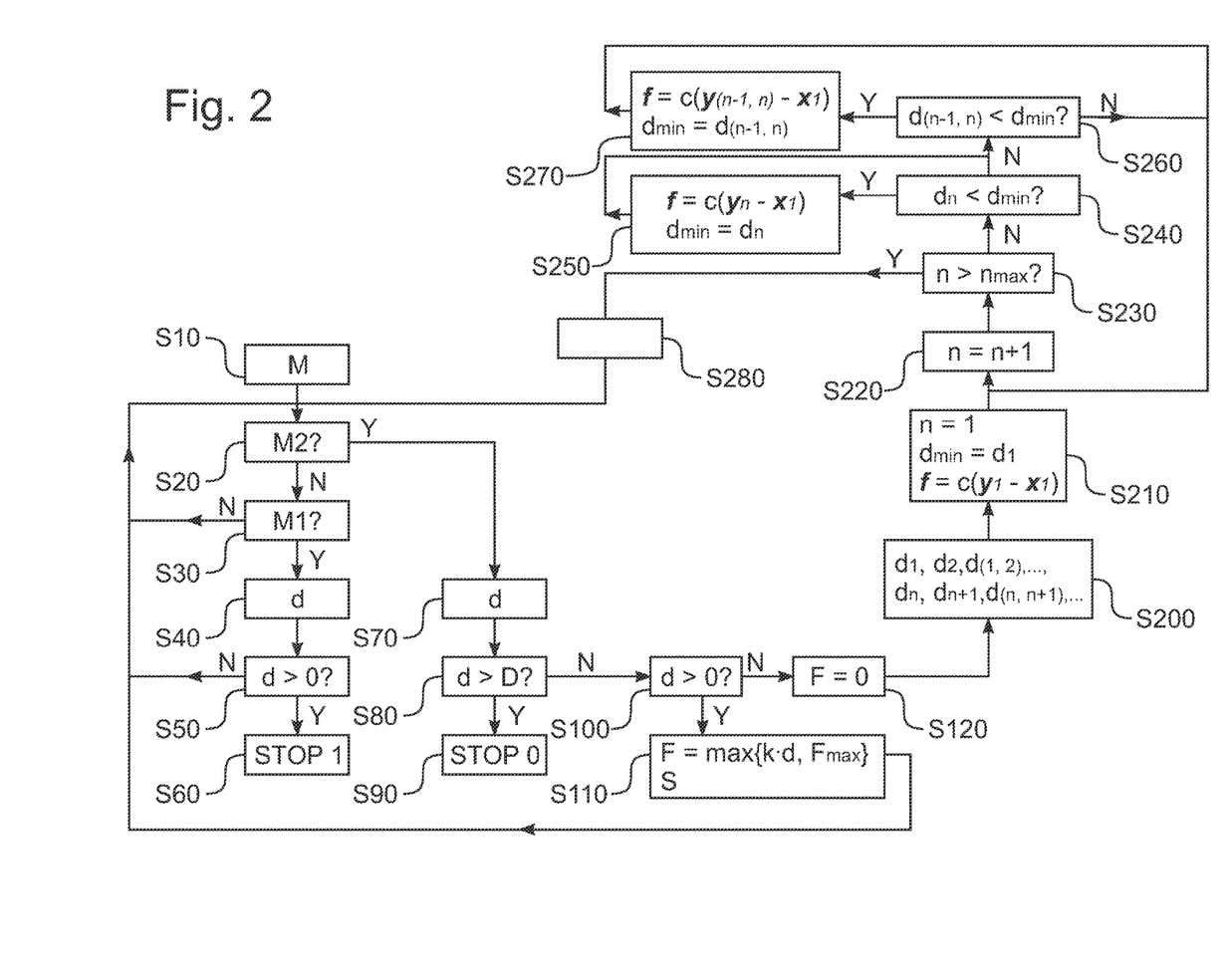
FIG. 2 is a schematic illustration of the procedure of a method according to one model of the present invention.
Figure 3:
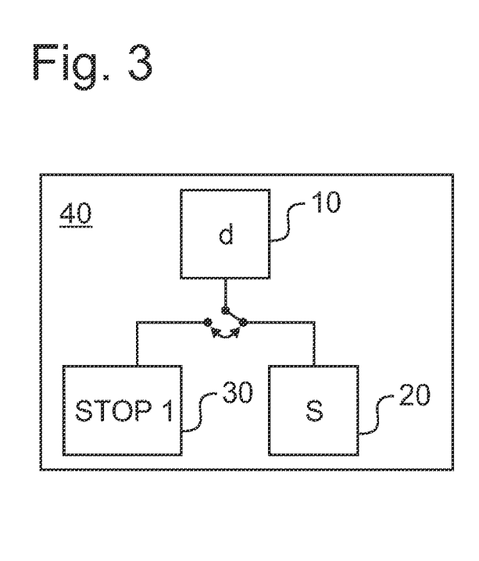
FIG. 3 is a schematic illustration of a section of a control device to implement the method.

FIG. 1, 2 show a section of a state space of a robot to illustrate a method according to one model of the present invention, or its procedure, executed by a device partially indicated in FIG. 3. The two previously described aspects are illustrated together by way of an example; they can, however, also be implemented independently.

First, a first mode of operation M1 or a different second mode of operation M2 is selected in a step S10, for example via a user's input. In a subsequent step S20, a device 40, hardware and software technically configured to execute the method described here and partially indicated in FIG. 3, checks if the second mode of operation (S20: "Y") is selected; in a subsequent step S30 it checks if the first mode of operation (S30: "Y") is selected. If the neither of the two modes of operation is selected (S20: "N", S30: "N"), the process reverts back to step S20.

The robot is movable by manual application of a guiding force on the robot at least in the second mode of operation M2, for example in an impedance-regulated manner as illustrated in the following, or controlled in a gravity-compensated manner. In the first mode of operation, on the other hand, the robot is moved automatedly in a program-controlled manner.

If the first mode of operation M1 is selected (S30: "Y"), a distance d of a state variable of the robot from a first limit is determined in a subsequent step S40.

In the two-dimensional example, simplified so as to be a better representation, the state variable x consists of two Cartesian position coordinates $x_i$, $x_j$ of the TCP of a robot (not shown). To illustrate, in FIG. 1, two different values $x_1$ and $x_2$ for this state variable, i.e. two different TCP positions $x_1$, $x_2$ are marked in the state space $\{x_i, x_j\}$.

In order to be a better representation, the first limit G is defined in a simplified manner by $G_1: x_i=0$ and $G_2: x_j=0$, and is indicated in FIG. 1 with a dotted line. The limit is oriented in such a way, that TCP positions with positive coordinate values, such as in particular the example position $x_1$, exhibit a negative distance d<0, while TCP positions with at least one negative coordinate value, such as in particular the example position $x_2$ exhibit a positive distance d>0.

In the first mode of operation M1, in a subsequent step S50, the device 40 checks if this distance d satisfies a first condition, which is then satisfied in the design example, when the TCP exceeds the limit G, or the signed distance d is greater than zero (d>0).

If the distance d satisfies the first condition (S50: "Y"), a safety response is triggered, in the design example a STOP 1. Otherwise (S50: "N"), the process reverts back to step S20. In other words, a STOP 1 is triggered in the first mode of operation M1, as soon as the TCP exceeds the limit G.

If the second mode of operation M2 is selected (S20: "Y"), the distance d from the first limit G is determined in a subsequent step S70, in the same manner as in the first mode of operation M1. Correspondingly, the steps S40 and S70 can also be replaced with a common step from step S20. In particular, an output of a distance means 10 of the control device 40 of the robot, as indicated in FIG. 3, can be connected in the first mode of operation M1 with a safety means 30 of the control device 40 to trigger the safety response STOP 1, and in the second mode of operation M2 with a signal means 20 of the control device to emit a signal S.

A subsequent step S80 in the second mode of operation M2 checks if the distance d satisfies a second condition d>D, different from the first condition d>0, with a specified constant D>0. In the simplified design example, this corresponds to the test if the distance of the TCP position from a second limit different from the first limit G, indicated in FIG. 1 with a double dot dashed line, satisfies the condition d>0.

If the test in step S80 shows that the TCP exceeds the second limit, or the distance to the first limit G is greater than the specified constant D (S80: "Y"), a STOP 0 is initiated in a step S90 as a safety response different from the safety response in the first mode of operation. Therefore, safety monitoring can occur in the second mode of operation as well.

If the test in step S80 shows that the TCP does not exceed the second limit, or the distance to the first limit G is not greater than the specified constant D (S80: "N"), a step S100 checks if the distance d satisfies the first condition, which is also tested in step S50 in the first mode of operation M1 and is satisfied if the TCP exceeds the limit G or the signed distance d is greater than zero (d>0).

If the distance d in the second mode of operation M2 satisfies only the first condition (S100: "Y") no safety response is triggered. Thus the safety response STOP 1 in the second mode of operation M2 is triggered not for this reason or if, because or as soon as the distance d satisfies the first condition. Therefore, as previously illustrated, the triggering of a safety response, in the design example a STOP 0, also while the first condition is satisfied, is not ruled out. The decisive factor in this regard is that the fulfillment of the first condition is not enough to trigger the safety response of the first mode of operation; in the design example, however, it is geometrically necessary.

Instead, in a step S110, a positioning force F is motorically applied to the robot in dependence on the distance d, so as to reduce the distance d when the robot is unobstructed, if the distance d satisfies the condition d>0 (S100: "Y"). For this purpose, as indicated in FIG. 1, the positioning force F is directed to the limit G. It is proportional to the distance (F=k□d) and limited by the maximum value $F_{max}$. In one variation it can also additionally or alternatively be proportional to a temporal change □d/□t.

As a result, when the limit G is exceeded in the second mode of operation M2, the safety response STOP 1 is not triggered as in the first mode of operation M1, but instead the user, who moves the robot by manual application of a positioning force, is haptically given feedback in the form of a restoring force that increases up to the maximum value $F_{max}$ with increasing advancement through a prohibited range defined by the limit G.

In addition the optic, acoustic and/or haptic signal S, for example a vibration, is emitted in step S110.

To test the safety monitoring of the first mode of operation for exceedance of the first limit G, the user accordingly moves the robot in the second mode of operation M2 by manual application of a guiding force on the robot in such a way, that the distance d of the state variable x of the robot from this limit G satisfies the first condition d>0 and haptically senses the limit through the resulting applied restoring force F. He is also notified of it by the signal S. Since the output of the distance means 10, connected in the first mode of operation M1 with the safety means 30 to initiate the STOP 1, is connected in the second mode of operation M2 with the signal means 20 to emit the signal S (see FIG. 3), the signal S is emitted along with the restoring force F instead of the STOP 1. The user can therefore test the safety monitoring both signal-technically and physically as well.

On the other hand, if the STOP 0 is triggered in step S90 in the second mode of operation, no positioning force is applied. In this respect this safety response, so to speak, overrules the haptic feedback of the exceedance of the limit G.

If the distance d in the second mode of operation M2 does not satisfy the first condition (S100: "N") either, no restoring positioning force back to the limit G is applied in a step S120, or this force F is set to zero.

In a subsequent step S200, in the second mode of operation M2, the distances of the state variable x of the robot to, different from one another, specified references in the state space of the robot are determined.

In the design example, simplified so as to be a better representation, a circular track B of the TCP of the robot, defined by two points $y_n$ and $y_{n+1}$, is indicated by a dot dashed line to illustrate this. In step S200, the distance $d_n$ of the current state variable $x_1$ to the specified reference $y_n$, the distance $d_{n+1}$ of the current state variable $x_1$ to the specified reference $y_{n+1}$ as well the distance $d_{(n, n+1)}$ of the current state variable $x_1$ to the specified reference B, in the design example the distance to point $y_{(n, n+1)}$ of the circular track B closest to the current TCP position $x_1$, are then determined.

By processing the steps S210 to S280, to be discussed in the following, the smallest distance $d_{min}$ of the distances is then determined, and a positioning force f, indicated in FIG. 1, is motorically applied to the robot so as to minimize the smallest distance $d_{min}$ when the robot is unobstructed.

To begin, in an initializing step S210, a counter n is set to 1, a variable $d_{min}$ for the to date smallest ascertained distance with the determined distance $d_1$ to a first of the specified references $y_1$ is pre-allocated and an, in the simplified design example two-dimensional, vector variable for the positioning force f to be applied is pre-allocated a value that is proportional to the difference vector between the current TCP position $x_1$ and the first reference $y_1$.

In a subsequent step S220 the counter n is increased by 1, and in a following step S230 a check to verify that all references have been processed is conducted.

If this is not the case (S230: "N"), in a step S240, the distance $d_n$ of the reference $y_n$ corresponding to this counter n is checked to see if it is smaller than the to date ascertained smallest distance $d_{min}$.

If this is the case (S240: "Y"), in a step S250, this distance $d_n$ is set as the new smallest distance $d_{min}$ and the vector variable for the positioning force f to be applied is assigned a value that is proportional to the difference vector between the current TCP position $x_1$ and this reference $y_n$ corresponding to the counter n.

If, however, the distance $d_n$ of the reference $y_n$ corresponding to the counter n is not smaller than the to date ascertained smallest distance $d_{min}$ (S240: "N"), or if $d_{min}$ and f have been reassigned in step S250, the distance $d_{(n,\,n+1)}$ of the track B between the track point $y_n$ corresponding to this counter n and the following track point $y_{n+1}$ is checked in a step S260 whether it is smaller than the to date ascertained smallest distance $d_{min}$.

If this is the case (S260: "Y"), in a step S270, this distance $d_{(n,\,n+1)}$ is set as the new smallest distance $d_{min}$ and the vector variable for the positioning force f to be applied is assigned a value that is proportional to the difference vector between the current TCP position $x_1$ and the track point $y_{(n,\,n+1)}$ between $y_n$ and $y_{n+1}$ that is closest to the current TCP position.

The process then returns to step S220 and increments the counter n.

If all references, in the design example all track points and the track defined by them, have been processed (S230: "Y"), the positioning force f, determined in this way, is motorically applied to the robot. In addition, the reference in the state space of the robot that exhibits the smallest distance is displayed (not shown).

The TCP is hereby, as indicated in FIG. 1, taken to the reference that is closest to its current position $x_1$ in an impedance-controlled manner; in the design example to the closest track point $y_{(n,\,n+1)}$.

In particular the robot track B can thus easily and intuitively be checked haptically. The specified track points $y_1, \ldots, y_n, y_{n+1}, \ldots$ in particular can easily be determined directly, if the steps S260, S270 are omitted in the design example, i.e. only the specified track points, instead of also the track, are used as references. Likewise, in addition or alternatively, a virtual structure in the form of the previously described limit G can also be used as a reference and the TCP can be taken to it in a force controlled manner, so as to subsequently exceed it and thus test the safety monitoring. In this context it should be noted that the limit G represents a plane hypersurface or wall in the state space $\{x_i, x_j\}$.

Even though examples have been discussed in the foregoing description, it should be noted that a large number of variations are possible.

In particular, as illustrated above, instead of the initiation of the safety response STOP 1 on the one hand, and the application of a positioning force f driving to the closest reference $y_{(n,\,n+1)}$ on the other hand, the two aspects of the application of the positioning force F restoring to the limit G can also be realized independently. In this regard, in the design example of FIG. 2, in particular steps S10 to S120, which concern the aspect of the application of the positioning force driving back to the limit instead of the initiation of the safety response, or steps S200 to S280, which concern the aspect of the application of a positioning force driving to the closest reference, can be omitted.

While the present invention has been illustrated by the description of specific embodiments thereof, and while the embodiments have been described in considerable detail, it is not intended to restrict or in any way limit the scope of the appended claims to such detail. The various features discussed herein may be used alone or in any combination. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope or spirit of the general inventive concept.

LIST OF REFERENCE SIGNS

10 Distance means
20 Signal means
30 Safety means
40 (Control) Device
$x_1; x_2$ TCP Position
$y_n; y_{n+1}$ Specified track point
$y_{(n,\,n+1)}$ Closest track point
B Track
$d_{(min)}$ (smallest) distance
D Specified constant
$G_1, G_2$ First limit
F; f Positioning force
M1 First mode of operation
M2 Second mode of operation
S Signal

What is claimed is:

1. A method for controlling a robot in at least one pose of the robot and in one of a first mode of operation or a second mode of operation, wherein the robot can be moved by manually applying a guiding force to the robot in the second mode of operation, the method comprising:
   determining a distance of one of a plurality of state variables of the robot beyond a first limit;
   when the robot is operating in the first mode of operation, triggering a safety response when the distance satisfies a first condition; and
   when the robot is operating in the second mode of operation and the distance satisfies the first condition, then:
   motorically applying a positioning force to the robot in dependence on the determined distance such that the distance is reduced when the robot is unobstructed.

2. The method of claim 1, further comprising:
   emitting a signal when the robot is operating in the second mode of operation and the distance satisfies the first condition.

3. The method of claim 2, wherein the signal is at least one of:
   an optic signal;
   an acoustic signal; or
   a haptic signal.

4. The method of claim 2, wherein:
   an output of a distance means for determining the distance is connected with a safety means for triggering the safety response in the first mode of operation; and
   the output of the distance means is connected with a signal means for emitting the signal in the second mode of operation.

5. The method of claim 1, further comprising:
   determining a second distance of a state variable of the robot from a second limit that is different from the first limit; and
   triggering a safety response in the second mode of operation when the second distance satisfies a second condition, or when a third distance of a state variable of the robot from a third limit satisfies a third condition that is different from the first condition.

6. The method of claim 5, wherein the safety response is triggered in the second mode of operation without motorically applying the positioning force on the robot to reduce the distance.

7. The method of claim 1, wherein at least one of the plurality of state variables of the robot includes at least one of:
at least one position coordinate and/or orientation coordinate of at least one robot-fixed reference;
at least a time derivative of the at least one position coordinate and/or orientation coordinate;
at least one joint coordinate of the robot; or
at least one time derivative of the at least one joint coordinate.

8. The method of claim 7, wherein the at least one robot fixed reference is a tool center point.

9. The method of claim 1, wherein the safety response of the robot comprises at least one of:
shutting down the robot; or
separation of at least one drive of the robot from a power supply.

10. The method of claim 9, wherein shutting down the robot comprises shutting down via at least a brake and/or at least a drive of the robot.

11. The method of claim 1, wherein at least one of a plurality of limits is dependent on one of the state variables.

12. The method of claim 1, wherein at least one of the limits is defined by at least two hypersurfaces and/or at least one curved hypersurface in a state space of the robot.

13. The method of claim 12, wherein the at least two hypersurfaces are parallel hypersurfaces.

14. The method of claim 1, further comprising:
automatedly moving the robot by program-control in the first mode of operation; or
moving the robot by manual application of a guiding force on the robot.

15. The method of claim 1, further comprising:
moving the robot in the second mode of operation by manual application of a guiding force on the robot in such a way that the distance of the state variable of the robot from the first limit satisfies the first condition.

16. The method of claim 1, wherein:
determining a distance of a state variable of the robot from a first limit comprises:
determining distances of the state variable of the robot from at least two different specified references in a state space of the robot, and
identifying the smallest of the determined distances; and
motorically applying a positioning force to the robot comprises motorically applying the positioning force to the robot so as to reduce the smallest of the distances when the robot is unobstructed.

17. The method of claim 16, wherein the specified references in the state space of the robot include at least one of:

positions of a robot-fixed reference;
poses of the robot; or
structures in the state space of the robot.

18. The method of claim 17, wherein at least one of:
the position of a robot-fixed reference is a tool center point;
the poses of the robot comprise a specified path of the robot; or
the structures in the space state of the robot are at least one of virtual structures, walls, or coordinate systems.

19. The method of claim 16, further comprising displaying the reference in the state space of the robot that exhibits the smallest determined distance.

20. The method of claim 16, further comprising flexibly controlling the robot so as to be movable by manual application of a guiding force to the robot.

21. The method of claim 20, wherein the flexible control is at least one of a force-regulated control or gravity-compensated control.

22. A device for controlling a robot that is operable in a first mode of operation or a second mode of operation, wherein the robot can be moved by manually applying a guiding force to the robot in the second mode of operation, the device including program code stored on a non-transitory machine-readable medium that, when executed by the device, causes the device to:
determine a distance of a state variable of the robot beyond a first limit;
when the robot is operating in the first mode of operation, trigger a safety response when the distance satisfies a first condition; and
when the robot is operating in the second mode of operation and the distance satisfies the first condition, then:
not trigger the safety response, and
motorically apply a positioning force to the robot in dependence on the determined distance such that the distance is reduced when the robot is unobstructed.

23. A computer program product for controlling a robot that is operable in a first mode of operation or a second mode of operation, wherein the robot can be moved by manually applying a guiding force to the robot in the second mode of operation, the computer program product having programming code stored on a non-transitory machine-readable medium, the programming code configured to, when executed by a computer, cause the computer to:
determine a distance of a state variable of the robot beyond a first limit;
when the robot is operating in the first mode of operation, trigger a safety response when the distance satisfies a first condition; and
when the robot is operating in the second mode of operation and the distance satisfies the first condition, then:
not trigger the safety response, and
motorically apply a positioning force to the robot in dependence on the determined distance such that the distance is reduced when the robot is unobstructed.

* * * * *